2,835,891
Patented May 20, 1958

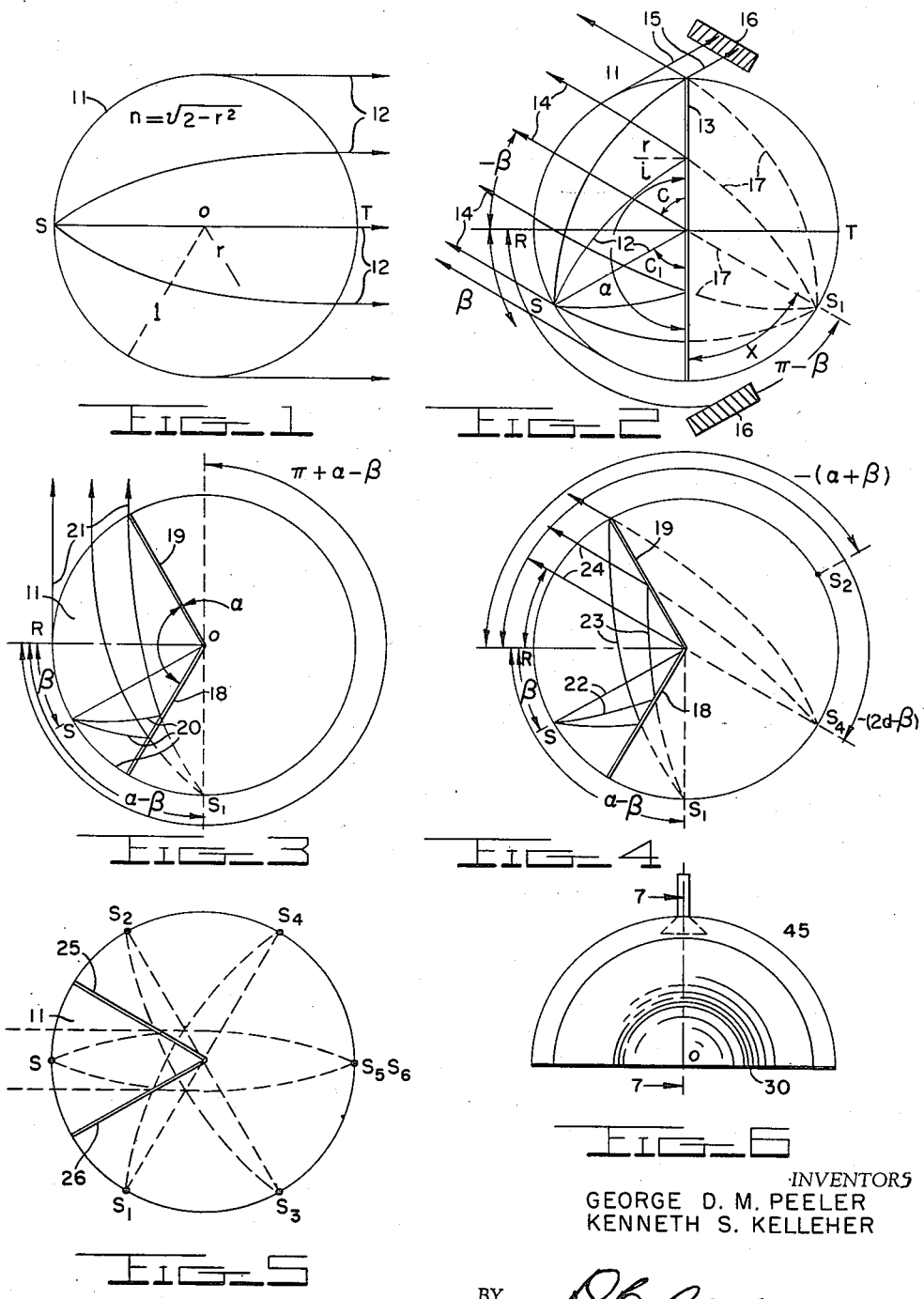

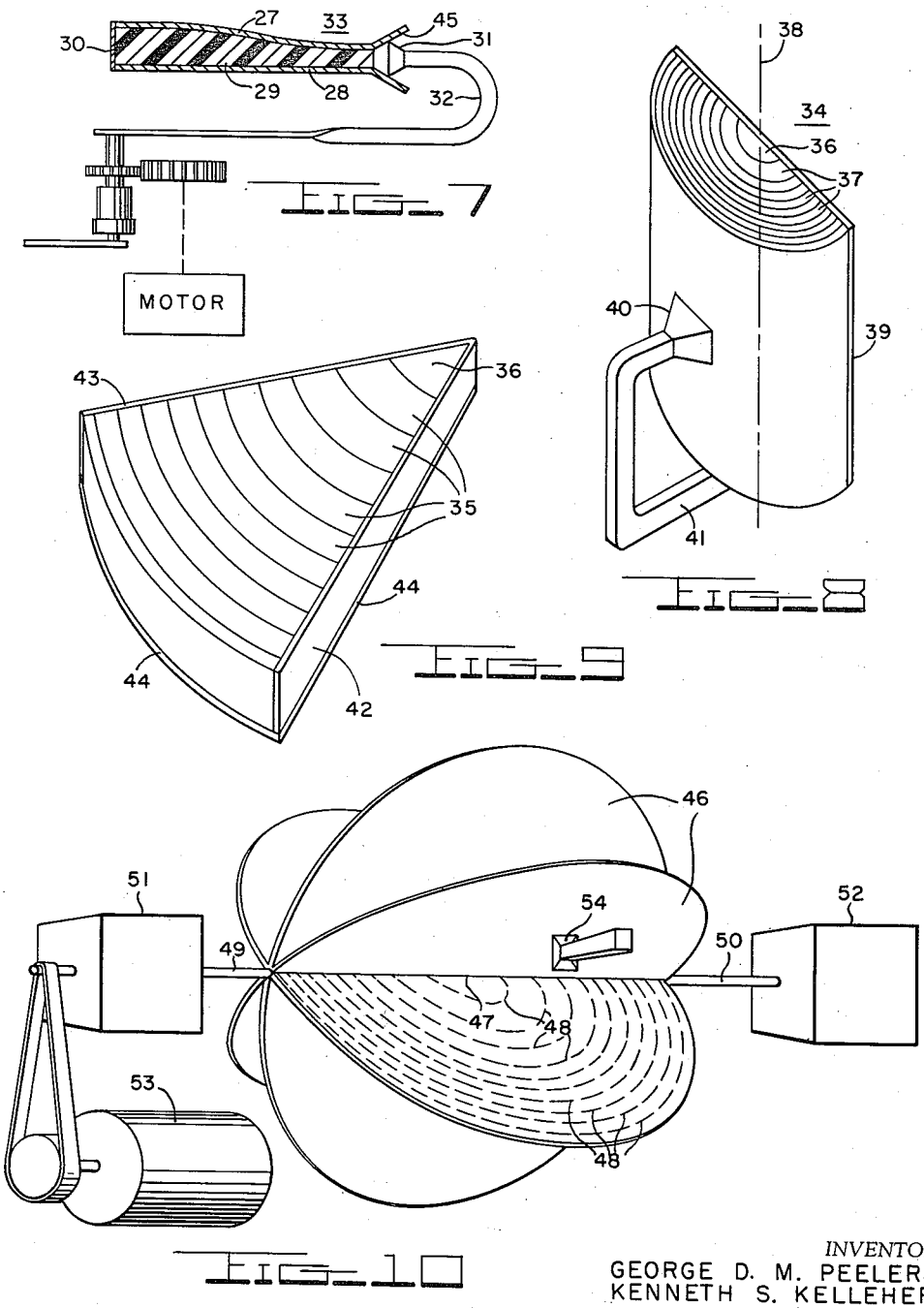

2,835,891
VIRTUAL IMAGE LUNEBERG LENS

George D. M. Peeler, Hyattsville, Md., and Kenneth S. Kelleher, Alexandria, Va., assignors to the United States of America as represented by the Secretary of the Navy Application November 12, 1953, Serial No. 391,774

14 Claims. (Cl. 343—754)

(Granted under Title 35, U. S. Code (1952), sec. 266)

This invention relates generally to microwave optics and more particularly to a virtual source Luneberg lens.

In recent years there has been a considerable amount of interest in practical applications and means of constructing Luneberg lenses. The lens was described initially by R. K. Luneberg in "Mathematical Theory of Optics," Brown University Graduate School, in 1944. The Luneberg lens is a spherical, variable-index-of-refraction system in which, for a unit-radius lens, the index of refraction $n$ varies with the distance from the center $r$ as $n=\sqrt{2-r^2}$. In practice it has been difficult to construct lenses meeting the theoretical requirements. To simplify construction most of the initial experimentation has been performed on two dimensional Luneberg lenses; i. e., cylindrical rather than spherical lenses. Examples of these two dimensional lenses may be found in the U. S. Patents 2,576,181 to Iams and 2,576,182 to Wilkinson. The primary advantage of the Luneberg lens is the wide-angle high speed scan possible using a fixed lens with a rotating feed horn.

The present invention involves utilization of only a portion of the lens together with a proper reflecting surface at the boundaries which normally abut the remainder of the lens. The lens may comprise only half a complete lens with a reflector abutting the surface which includes the axis of curvature of the lens. Further advantages have been discovered using a sector of the lens of less than 180° such as 60° sectors.

Therefore it is an object of this invention to provide a Luneberg lens of reduced size and weight.

It is another object of this invention to provide a lens adapted to high velocity, wide angle scanning.

It is another object of this invention to provide a lens adapted to high velocity sector scanning.

It is another object of this invention to provide a Luneberg lens of reduced size and weight employing a virtual source to produce a radiation beam.

It is another object of this invention to provide a scanning antenna system in which a number of virtual source Luneberg lenses rotate with respect to a fixed feed to produce high velocity sector scanning.

Other objects and attendant advantages of this invention will be readily appreciated as the same becomes better understood by reference to the following detailed description when considered in connection with the accompanying drawings wherein:

Figure 1 is a diagrammatic representation of the focusing of electromagnetic waves in a conventional Luneberg lens.

Figures 2 to 5 are diagrammatic representations of the focusing in virtual image lenses of various angles.

Figures 6 and 7 represent plan and section views respectively of one embodiment of the half Luneberg lens.

Figure 8 is a schematic showing of another embodiment of a cylindrical half Luneberg lens.

Figure 9 is a perspective view of another embodiment of a virtual image lens.

Figure 10 is a schematic view of a spherical, virtual image Luneberg lens with the dielectric cut away and showing the position of the feed and the drive.

To better explain the nature of the invention, brief reference will be made to the principle of operation of the conventional Luneberg lens. Although the Luneberg lens is theoretically spherical in shape, the principle will be explained in two dimensions only. It will be understood that the explanation would apply for every plane passing through the source and the center of the lens.

In Fig. 1, the lens 11 is shown diagrammatically with the source S on the surface of the lens radiating rays 12. It is well known that because of the variable index of refraction $n$, which varies with the distance $r$ from the center O as $n=\sqrt{2-r^2}$ for a unit radius lens, the rays which leave source S on the surface of the lens are focused into parallel rays.

In developing the principle of the virtual image Luneberg lens the simplest form will be treated first, i. e., the half Luneberg lens as shown in Fig. 2. In this embodiment, the lens 11 has been cut in half at the center O and the removed half replaced by a plane reflecting member 13. As in Fig. 1, source S radiates rays 12, but instead of passing through the side opposite from the source, the rays 12 encounter reflecting surface 13 and are reflected as rays 14. A small amount of the radiated ray energy is not reflected and passes through the lens as shown by rays 15. Inasmuch as this beam is sometimes undesirable, absorbing means 16 can be provided to prevent such radiation. Another method for reducing the direct beam is through the extension of reflectors 13 beyond the edge of the lens so that part of the direct beam energy is directed into the reflected beam. Since this energy is in phase with the energy already present in the reflected beam, this method should maintain the reflected beam gain more constant with variations in $\beta$.

The virtual source $S_1$ represents the apparent source of the rays 14 reflected from the surface of member 13. In like manner, the dashed lines 17 indicate the apparent path of the rays from virtual source $S_1$. Letting RO represent a radius of the lens perpendicular to the reflecting surface 13, the angle $\beta$ designates the angular displacement counter-clockwise about the center of the source S from the reference line RO. Since the angle of incidence equals the angle of reflection, the complements of these angles are also equal. Typical complementary angles are designated C and $C_1$ in Fig. 2. Because they are formed by intersecting lines, the angle X from the lower reflecting surface to $S_1$ also equals angle C and therefore $C_1$. By inspection of Fig. 2 it will be observed that angle C is equal to half the lens angle $\alpha$ minus $\beta$, or $$\frac{\alpha}{2}-\beta$$

The angular displacement of the virtual source $S_1$ from RO is therefore $\beta+C+X$ which simplifies to $\alpha-\beta$. For the case illustrated in Fig. 2 where $\alpha$ is 180°, the displacement angle of $S_1$ is $\pi-\beta$ and is so designated in the drawing. Inasmuch as the radiation is 180° from the virtual source, the angular displacement of the radiation angle can be found for Fig. 2 as $\pi+(\pi-\beta)$ or $-\beta$.

It should be understood that to simplify the above analysis the ray from the source S to center O was used since only radially directed rays follow straight lines. The curved rays behave similarly at the reflecting surface but the curved paths of approach to and departure from the reflecting surface 13 would complicate the geometric analysis. In like manner the analysis using the flat reflector 13 is a simplification which may be carried over into the latter figures to locate the position of the virtual sources. Thus when two reflectors intersect at an angle at O as in Figs. 3, 4 and 5, the virtual sources for each reflecting surface may be located by considering the particular reflector as extending diametrically and working with the radial rays as in the analysis of Fig. 2.

Fig. 2 shows the special case where the lens angle which will be represented by $\alpha$ is 180° or $\pi$. It has been found that other advantages accrue from employing values of lens angle $\alpha$ considerably less than 180°. But the smaller the angle, the more difficult the diagrammatic showing becomes since the number of virtual sources increases as will be seen below. For this reason, the mathematical relationships will be developed using lens angles greater than 90°.

The wedge shaped lens shown in Figs. 3 and 4 has a lens angle $\alpha$ of between 90° and 180° formed by reflecting surfaces 18 and 19 which abut the Luneberg lens section 11. In both figures, the reference axis RO bisects the wedge angle $\alpha$ and the source is displaced an angle $\beta$ from reference RO following the terminology of Fig. 2. Wide angle rays 20 radiate from source S at such an angle that they are reflected only by reflector 18 and then radiated as rays 21 from the lens as if they originated at the virtual source $S_1$. It can be readily determined that the position of the virtual source $S_1$ is $\alpha - \beta$ from RO and the rays 21 are radiated at an angle 180° from the virtual source or $\pi + \alpha - \beta$ from RO.

In contrast, Fig. 4 shows only the narrower angle rays 22 which, when radiated from source S, are reflected from reflector 18 as rays 23, which strike reflector 19 and are finally radiated as rays 24. Since each reflecting surface may be diagrammatically replaced by the virtual source, source $S_4$ is shown as the apparent source of rays 24. By further application of principles of plane geometry it may be shown that the position of virtual source $S_4$ is $-(2\alpha - \beta)$ from line RO. The angle of the radiated beam 180° from $S_4$ is $\pi - (2\alpha - \beta)$. The convention has been adopted in designating the virtual sources that the virtual sources for one reflector will be designated with odd number subscripts, as 1, 3, etc., for reflector 18, while the virtual sources for the other reflector will be designated by even number subscripts at 2, 4, etc., for reflector 19. Inspection of Fig. 4 reveals that there is no $S_3$; the reason for this condition is that the lens angle $\alpha$ and source displacement $\beta$ are such that the only rays reflected from surface 18 are rays 22 which originate at the real source. For there to be an $S_3$ some rays would have to be reflected from surface 19 and thence to reflector 18. The position of $S_2$ is also shown; it represents the apparent source of rays from S which are reflected directly by 19. For any wedge angle $\alpha$, similar techniques may be used to show that all the rays are radiated into perfectly focused beams as if they originated from their respective virtual sources.

From the two examples of Figs. 3 and 4, it is obvious that the sector lenses of less than 180° lens angle will produce several beams radiated at different angles. By proper choice of the lens angle $\alpha$ and by modification of the feed at S the lenses of this type may be used effectively to produce a single beam. Thus in the illustration of Figs. 3 and 4, the feed at S may be designed to substantially reduce direct radiation toward the reflector 19 so that the beam formed by rays 24 will predominate.

In addition, an idea of the relative gains of these beams may be obtained by noting that the beam from the rays leaving the feed at large angles from the central ray, rays 20 and 21 of Fig. 3 for example, are radiated from the lens from relatively small apertures; it has been found experimentally and can be proved theoretically that beams radiated from small apertures have relatively large beamwidths. Also, owing to the illumination taper of a normal feed, these beams contain relatively little energy. The combination of these effects considerably reduces the gain of such beams, and as a result the beams formed from rays leaving the feed at small angles from the central ray, rays 22 in Fig. 4 for example, are the most important ones.

As was suggested above, by proper selection of the lens angle $\alpha$ the number of radiated beams can be reduced. The following table, developed through the method of geometrical analysis shown above, may be used in determining the relative source and radiated beam positions.

| Beam Formulation | Virtual Source | Virtual Source Position | Radiated Beam Position |
|---|---|---|---|
| Direct | (S) | $\beta$ | $\pi + \beta$ |
| Rays with one reflection | $S_1$ | $\alpha - \beta$ | $\pi + \alpha - \beta$ |
|  | $S_2$ | $-(\alpha + \beta)$ | $\pi - (\alpha + \beta)$ |
| Rays with two reflections | $S_3$ | $2\alpha + \beta$ | $\pi + 2\alpha + \beta$ |
|  | $S_4$ | $-(2\alpha - \beta)$ | $\pi - (2\alpha - \beta)$ |
| Rays with three reflections | $S_5$ | $3\alpha - \beta$ | $\pi + 3\alpha - \beta$ |
|  | $S_6$ | $-(3\alpha + \beta)$ | $\pi - (3\alpha + \beta)$ |
| Rays with $m$ reflections | $S_{2m-1}$ | $m\alpha + (-1)^m \beta$ | $\pi + m\alpha + (-1)^m \beta$ |
|  | $S_{2m}$ | $-[m\alpha + (-1)^{m-1} \beta]$ | $\pi - [m\alpha + (-1)^{m-1} \beta]$ |

The reduction of the number of beams is realized by selecting a lens angle at which two of the virtual sources producing the primary beams are coincident. When this is accomplished there will be one beam which predominates over all other which become negligible in strength. It has been found that when $\alpha = \pi/p$ where $p$ is any integer, the two beams receiving the maximum number of reflections, and therefore the ones with greatest gain, will be coincident. In the example of Fig. 2 where $p = 1$, $S_2$ may be considered coincident with $S_1$. The fact that the maximum number of reflections will equal $$\frac{\pi}{\alpha}$$

or $p$ can be verified easily by means of a diagram. The coincident aspect of these maximum gain beams may be easily vertified by observing the table above in which the virtual source positions and the radiated-beam positions have been evolved in a similar fashion to that used for $S_1$ and $S_4$ in Fig. 4 above. As may be observed from Fig. 5, the notation for the virtual sources is given so that the order of their positions from S on a circumference of the circle is $S_1$, $S_3$, $S_5$ . . . in the positive direction and $S_2$, $S_4$, $S_6$ . . . in the negative direction.

For a $p$ of 3, $$\alpha = \frac{\pi}{p} \text{ or } 60°$$

The diagram of Fig. 5 shows a virtual image lens 11 with reflectors 25 and 26 forming a lens angle of 60°. With a $p$ of 3, there will be no more than three reflections for any ray. Half the rays will be reflected by reflector 25 first and half by 26. Thus there will be six virtual image sources, the last two of which, $S_5$ and $S_6$, will be coincident and radiate from the lens most of energy supplied from source S.

It can also be seen from the table that the primary radiated beam position, when $p$ is an integer, is equal to plus or minus the source displaced from reference line RO. Thus when $p$ is an odd integer, the radiated beam position is equal to $-\beta$ so the source and radiated beam will be separated by an angle $2\beta$. Further, when $p$ is an even integer, the radiated beam position coincides with the source position. For this reason only for lenses with $p$ as an odd integer are adaptable to being rotated relative to a fixed feed to obtain scanning. If a lens with a lens angle such that $p$ were an even integer were rotated relative to a fixed feed, the primary beam would always be radiated toward the source or feed so no scanning would take place. However, for a lens with $p$ an even integer, scanning is obtained by rotating a feed about a fixed lens. Other considerations as to scanning will be brought up in the description of the various embodiments of the invention.

A practical embodiment of a virtual image half Luneberg lens such as is shown diagrammatically in Fig. 2 is pictured in Figs. 6 and 7. This embodiment is a cylindrical type in which the variation in the refraction $n$ index is obtained by utilizing the $TE_{10}$ mode (E-field perpendicular to the lens axis) and varying the lens thickness with the radius. U. S. Patent 2,576,182 to Wilkinson discloses a full cylindrical Luneberg lens employing the principle of the plates of varying separation. Aluminum plates 27 and 28 make up the top and bottom of the lens 33 between which homogeneous dielectric material 29 such as polystyrene is placed. Instead of employing a complete disc shaped lens known in the prior art, the lens has been cut through the center O and aluminum reflector 30 has been secured abutting the dielectric surface intersecting the center O. A feed horn 31, directed toward the center O and spaced from the cylindrical surface of dielectric 29, is mounted to revolve about the center O at a fixed distance from the center. The necessary transition sections, rotary joints and drive means are employed in conventional manner to rotatably mount the wave guide 32 through which the horn 31 is fed. As was explained diagrammatically in connection with Fig. 2, the direct beam energy increases to substantial values for large values of $\beta$, hence the scan angle may be limited to 120° and absorbent shields 16 may be employed. In theory, though, the direct beam will not equal the reflected beam until $\beta$ equals 90°.

It is also contemplated that the lens 33 may be rotatably mounted about the axis O and the feed horn maintained fixed. In an application of that type, both halves of the lens would be employed but separated by reflector 30. As was explained above, where $p$ is odd and in this case it equals 1, scanning may be accomplished, sometimes to great advantage, by rotating the lens rather than the fed. Because of the magnitude of the direct beam, it has been found more practical to rotatably mount cylindrical or spherical sectional Luneberg lenses with lens angles of less than 90° as will be explained in connection with Fig. 10 below.

Another type of construction of a cylindrical half Luneberg lens is shown in the embodiment of Fig. 8. This elongated cylindrical lens 34 is particularly adapted to shipboard installations and reduces necessity for stabilization, produces more focusing and reduces the amount of feed blocking found in the flat type of Fig. 7. To achieve the varying index of refraction $n$, necessary for the Luneberg lens, layers of foam rubber of varying index $n$ have been combined to form a laminated lens approximating the requirement of $$n = \frac{\sqrt{2R^2 - r^2}}{R}$$

where R is the radius of the lens and $r$ the radius for a particular index of refraction $n$. Since the index $n$ will vary from 1 to 1.414, a number of pieces of foam rubber each of refractive indices varying from 1 to 1.414 are selected and assembled. To determine the thickness of each lamination or the radius from the center of each lamination border, the radius $r$ is computed by the above mentioned formula for the average value of refractive index for each pair of adjacent laminations. This value of $r$ will represent the distance from the center axis to the boundaries between each respective pair of laminations. It is also contemplated that any other suitable expanded or foamed material such as polystyrene might be employed. In addition the use of continuously varying dielectric rather than laminations is also contemplated. Artificial dielectric means such as metal pins of varying lengths and/or spacing have been successfully employed to achieve the varying dielectric. The actual foam rubber sheets 37 of a thickness equal to the differences of the computed values of $r$ for the boundaries were cemented together around a cylindrical center piece 36. The completed laminated cylinder was cut in half through the axis 38 and the aluminum reflecting member 39 cemented thereto. The horn 40 is mounted for rotation about the surface of lens 38 at its midpoint. Wave guide 41 from which the horn 40 is fed is mounted for rotation by any conventional means such as shown in the embodiment of Fig. 7.

As was explained in connection with the diagram of Fig. 5, certain advantages accrue from the use of a rather small lens angle $\alpha$. The embodiment of Fig. 9 is a virtual image Luneberg lens constructed of laminated foam rubber and having a lens angle of 60°. The structure is similar to that of Fig. 8 having laminated sections of foam rubber 35 and a center sector 36 of varying indices of refraction cemented together. The foam rubber wedge built up from pieces 35 and 36 is enclosed by the reflecting members 42 and 43 of aluminum or any other suitable conducting material which intersect at the apex of the wedge at a lens angle of 60° and extend radially in abutting relationship to the edges of the foam rubber wedge. The top and bottom of the foam rubber wedge are abutted by parallel plates 44, the top one of which has been removed to permit a view of the sections 35 and 36. The plates may be of conducting or non-conducting material since their purpose is simply to structurally support the foam rubber sections 35 and 36 and the reflecting members 42 and 43. Conical flares 45 such as are employed in the embodiment of Fig. 7 are also preferred in this embodiment to increase the lens aperture.

Because of the choice of lens angle, $\alpha = 60°$, this type of virtual image Luneberg lens is suitable for fixed operation with a moveable feed or for rotatable operation with a fixed feed. Rotating the lens gives the advantage of an increased sector of scan over that obtained with the moveable feed. Thus when the lens is rotated, a sector of $2\alpha$ may be scanned while with the lens fixed only $\alpha$ degrees may be scanned.

In order to employ such a rotatable sector to take advantage of the rapid sector scan, the embodiment of Fig. 10, in which a number of sectors have been combined to complete a sphere, has been evolved. The embodiment of Fig. 10 is shown with the dielectric portions of the sphere cut away so that reflecting surfaces 46 may be seen. The dielectric portion is of the laminated foam rubber type of construction as employed in the embodiment of Figs. 8 and 9 except in this case the laminations are spherical rather than cylindrical.

Referring to Fig. 10, the six semi-circular reflectors 46 intersect at an axis 47, each adjacent pair forming a lens angle of 60°. The reflectors 46 are made of any substantial conducting material; they serve as supports for the dielectric as well as being reflectors. The dashed lines 48 represent where the boundaries of the dielectric laminations would abut one of the reflectors 46. The semi-circles 48 have their centers at the midpoint of axis 47. The spherical surface generated by rotating each semi-circle 48 around axis 47 would represent a boundary between successive laminations of foam rubber.

The sectional spherical lens is supported for rotation by shafts 49 and 50 which are axially aligned with axis 47 and welded to the juncture of reflecting plates 46. The shafts 49 and 50 are supported respectively by speed changing mechanism 51 and pillow block 52. Shaft 49 is rotated through speed changer 51 by motor 53. The feed horn 54 is fixedly spaced adjacent the surface of the sphere and lies on a perpendicular to the midpoint of the axis 47.

As each 60° sector of the sphere rotates past the feed horn 54, the radiated beam will scan 120°. Thus on a complete revolution of the spherical lens, the radiated beam will scan the 120° sector six times. It is contemplated that when smaller sector scans are desired, the lens angle $\alpha$ can be further decreased keeping in mind the requirement that $p$ be odd in the formula $$\alpha = \frac{\pi}{p}$$

It is also contemplated that a cylindrical sectioned virtual image Luneberg lens may be mounted in a similar manner to the sphere shown in Fig. 10.

A further feature possible with the spherical lens but not the cylindrical lens, lies in the field of volumetric scanning. With the feed horn 54 of Fig. 10 in a fixed position, the focused beam will scan a vertical angle of 120° as stated above. By mounting the feed horn 54 for rotation horizontally around the circumference of the lens, scanning could be effected in the horizontal plane. Thus by rotating the feed horn 54 about a vertical axis intersecting the midpoint of 47 and rotating the sphere about axis 47, volumetric scanning is obtained.

It is obvious that other combinations of cylindrical and spherical Luneberg lenses with suitable reflectors could be constructed to meet particular requirements of scan angle, speed of scan, mounting requirements or limitations and so forth.

Although certain specific embodiments of this invention have been disclosed and described it is to be understood that they are merely illustrative of this invention and modifications may, of course, be made without departing from the spirit and scope of the invention as defined in the appended claims.

The invention described herein may be manufactured and used by or for the Government of the United States of America for governmental purposes without the payment of any royalties thereon or therefor.

What is claimed is:

1. An electromagnetic microwave scanning lens comprising at least one sector shaped portion of a Luneberg lens, each sector shaped portion being defined by two planes intersecting along a common axis of said Luneberg lens, and a pair of electromagnetic wave reflecting members abutting each portion along the surfaces defined by said planes.

2. An electromagnetic microwave scanning lens comprising at least one sector shaped portion of a two dimensional Luneberg lens, each sector shaped portion being defined by two planes intersecting along the axis of said Luneberg lens, and a pair of radially disposed electromagnetic wave reflecting members abutting each portion along the surfaces defined by said planes.

3. An electromagnetic microwave scanning lens comprising at least one sector shaped portion of a spherical Luneberg lens, each sector shaped portion being defined by two planes intersecting along a common axis of said Luneberg lens, and a pair of electromagnetic wave reflecting members abutting each portion along the surfaces defined by said planes.

4. An electromagnetic microwave scanning lens comprising a half Luneberg lens, said half portion being defined by a plane passing through an axis of a complete Luneberg lens, and a plane electromagnetic wave reflecting member abutting the plane portion of said half lens.

5. An electromagnetic microwave scanning lens comprising at least one sector shaped portion of a Luneberg lens, each sector shaped portion being defined by two planes intersecting along a common axis of said Luneberg lens, the angle of intersection of the plane surfaces of each sector shaped portion being equal to 180° divided by an integer, and a pair of electromagnetic wave reflecting members abutting each portion along the surfaces defined by said planes.

6. An electromagnetic microwave scanning lens comprising a Luneberg lens and a plurality of electromagnetic wave reflecting members dividing said lens into a plurality of sector shaped portions, said members being flat and intersecting at a common axis.

7. An electromagnetic microwave scanning lens comprising a Luneberg lens and a plurality of electromagnetic wave reflecting members dividing said lens into a plurality of sector shaped portions, said members being flat and intersecting at a common axis, the angle of intersection between any two members being equal to 180° divided by any integer.

8. An electromagnetic microwave antenna system comprising at least one sector shaped portion of a Luneberg lens, each sector shaped portion being defined by two planes intersecting along a common axis of said Luneberg lens, a pair of electromagnetic wave reflecting members abutting each portion along the surfaces defined by said planes, and an antenna feed horn adjacent and directed toward the curved surface of said lens and spaced equidistant from the ends through which said axis passes, said horn being mounted for movement along the periphery of said lens in a plane perpendicular to the axis.

9. An electromagnetic microwave antenna system comprising a Luneberg lens, a plurality of electromagnetic wave reflecting members dividing said lens into a plurality of sector shaped portions, said members being flat and intersecting at a common axis, the angles of intersection between any two members being equal to 180° divided by any integer, means supporting said Luneberg lens for rotation about said common axis, and an antenna feed horn mounted adjacent said lens in a plane perpendicular to the midpoint of said common axis, the output of said horn being directed toward said midpoint.

10. An electromagnetic microwave scanning lens comprising, a sector shaped portion of a Luneberg lens, said sector shape being defined by two planes intersecting along a common axis of said Luneberg lens, and a pair of electromagnetic wave reflecting members abutting said portion along the surfaces defined by said planes.

11. An electromagnetic microwave scanning lens comprising a two dimensional Luneberg lens, and a plurality of electromagnetic wave reflecting members dividing said lens into a plurality of sector shaped portions, said members being flat and intersecting at a common axis.

12. An electromagnetic microwave scanning lens comprising a spherical Luneberg lens, and a plurality of electromagnetic wave reflecting members dividing said lens into a plurality of sector shaped portions, said members being flat and intersecting at a common axis.

13. An electromagnetic microwave antenna system comprising at least one sector shaped portion of a Luneberg lens, each sector shaped portion being defined by two planes intersecting along a common axis of said Luneberg lens, a pair of electromagnetic wave reflecting members abutting each portion along the surfaces defined by said planes, an antenna feed horn mounted adjacent and directed toward the curved surface of said lens, said horn also being directed toward the mid-point of said common axis, and means providing relative rotational movement between said lens and said horn.

14. An electromagnetic microwave antenna system comprising a spherical Luneberg lens, a plurality of electromagnetic wave reflecting members dividing said lens into a plurality of sector shaped portions, said members being flat and intersecting at a common axis, the angles of intersection between any two members being equal to 180° divided by any integer, means supporting said Luneberg lens for rotation about said common axis, an antenna feed horn mounted adjacent and directed toward the curved surface of said lens, said horn also being directed toward the mid-point of said common axis, and means for rotating said feed horn about an axis perpendicular to said common axis.

References Cited in the file of this patent

UNITED STATES PATENTS

| | | |
|---|---|---|
| 2,547,416 | Skellett | Apr. 3, 1951 |
| 2,576,181 | Iams | Nov. 27, 1951 |
| 2,576,182 | Wilkinson | Nov. 27, 1951 |
| 2,599,896 | Clark | June 10, 1952 |

FOREIGN PATENTS

| | | |
|---|---|---|
| 697,163 | Great Britain | Sept. 16, 1953 |